United States Patent [19]

Tsunoda et al.

[11] 4,255,078
[45] Mar. 10, 1981

[54] METHOD OF CONTROLLING OPERATION OF MULTISTAGE HYDRAULIC MACHINES

[75] Inventors: Sachio Tsunoda; Masaharu Nonaka, both of Yokohama, Japan

[73] Assignee: Tokyo Shibaura Denki Kabushiki Kaisha, Japan

[21] Appl. No.: 9,928

[22] Filed: Feb. 5, 1979

[30] Foreign Application Priority Data

Feb. 14, 1978 [JP] Japan ................. 53-15035

[51] Int. Cl.³ ...................... F01D 17/00; F01D 21/00
[52] U.S. Cl. ............................................ 415/1
[58] Field of Search ............... 415/1, 13, 17, 30, 47, 415/48, 143, 146, 147, 500

[56] References Cited

U.S. PATENT DOCUMENTS

| | | | |
|---|---|---|---|
| 3,275,293 | 9/1966 | Hosogai et al. | 415/1 X |
| 3,309,057 | 3/1967 | Tonooka | 415/1 |
| 3,339,567 | 9/1967 | Fukasu et al. | 415/1 X |
| 3,403,888 | 10/1968 | Hartland | 415/1 |
| 3,886,373 | 5/1975 | Okada | 415/1 X |
| 4,137,004 | 1/1979 | Kuwabara et al. | 415/1 |
| 4,168,935 | 9/1979 | Ueda et al. | 415/1 |

FOREIGN PATENT DOCUMENTS

| | | | |
|---|---|---|---|
| 2002658 | 8/1971 | Fed. Rep. of Germany | 415/1 |
| 36-18553 | 10/1961 | Japan . | |
| 43-14253 | 6/1968 | Japan . | |
| 43-14254 | 6/1968 | Japan . | |

*Primary Examiner*—Stanley N. Gilreath
*Attorney, Agent, or Firm*—Stevens, Davis, Miller & Mosher

[57] ABSTRACT

In a method of controlling guide vanes of a multistage hydraulic machine including a plurality of stages interconnected by return passages of the type wherein under an abnormal condition which occurs when the operation of a water wheel or a pump is stopped or when the load of the water wheel is interrupted or the input of the pump is interrupted due to a fault of the machine, the guide vanes are closed such that the degree of opening of the guide vanes of a higher pressure stage is maintained to be always equal to or smaller than the degree of opening of the guide vanes of a lower pressure stage, the guide vanes of the lower pressure stage are not completely closed and maintains a predetermined small degree of opening when the guide vanes of the higher pressure stage are completely closed.

5 Claims, 4 Drawing Figures

METHOD OF CONTROLLING OPERATION OF MULTISTAGE HYDRAULIC MACHINES

BACKGROUND OF THE INVENTION

This invention relates to a method of controlling the operation of a multistage hydraulic machine of the type in which flow passages of the stages are communicated with each other through return passages more particularly a controlling method effected at a time of abnormal condition which occurs when the operation of a water wheel or a pump is stopped or when the load of the water wheel is interrupted or the input of the pump is interrupted due to a fault of the machine.

In a known hydraulic machine including a pump, a water wheel or a pump turbine, the operation control of the hydraulic machine has been performed by adjusting the opening of guide vanes provided for the peripheral wall of the runners of the hydraulic machine and by adjusting the amount of the water passing through the runners.

Although, in general, a multistage hydraulic machine comprises a plurality of stages provided with runners, respectively, which are communicated with each other through return passages, a Francis-type two-stage pump turbine is illustrated in FIG. 1 as one example.

Regarding the Francis-type two-stage pump turbine shown in FIG. 1, when the water wheel is operated, the water flowing into the casing 6 through a penstock 7 is discharged into a spillway 8 through guide vanes 4, a runner 3 of a high pressure stage, guide vanes 2, and a runner 1 of a low pressure stage. On the other hand, when the machine is operated as a pump turbine the pumped-up water flows in the direction opposite to that described above.

In a case where such abnormal condition as the load interruption of the water wheel or the interruption of that pump input occurs during the operation of the water wheel or pump turbine, or where the operation thereof is stopped for an operational reason, the guide vanes are rapidly closed completely or to a slight opening. When the opening of the guide vanes is varied, the flow amount of the water is also varied thereby inducing water pressure variation in the penstock 7 due to the water hammering action caused by the variation in the flow amount of the water. Abnormally great variation of the water pressure may damage the hydraulic machine. Therefore, in order to prevent such disadvantages and to safely operate the hydraullic machine, it is necessary to control the opening of the guide vanes particularly of a multistage hydraulic machine which comprises a plurality of stages communicated with each other through a return passage.

However, since present day multistage hydraulic machines still involve many problems to be solved, a method of accurately controlling the guide vanes has been desired.

The operation of a multistage hydraulic machine will be described hereunder in conjunction with FIG. 1.

Generally, the diameter of the flow passage of the multistage hydraulic machine is a minimum at portions provided with guide vanes and therefore, the water passes the guide vanes at the highest speed. Accordingly, regarding the Francis-type multistage hydraulic machine shown in FIG. 1 in which the flow passages of the respective stages are communicated with each other through the return passage 5, when it is necessary to control the degree of openings of the guide vanes 4 and 2 having different degree of openings, the flow amount of the water is mainly affected and controlled by the guide vanes having a smaller degree of opening. As described hereinabove, when the flow amount is rapidly changed by controlling the degree of opening of the guide vanes 4, the pressure of water in the penstock 7 is caused to vary due to the water hammering action and this pressure variation propagates to the water passage of the high pressure stage communicated with the penstock. In this case, the pressure wave caused by the pressure variation in the penstock 7 is reflected mainly by the stage having the guide vanes with the minimum degree of opening and most of the reflected pressure wave propagates to the water passage located on the upstream side of the guide vanes and hardly propagates to the water passages on the downstream side thereof. Thus, the structure of the passages upstream of the guide vanes is severely affected by the reflected pressure wave, but the passage downstream thereof is not so severely affected.

Accordingly, in a multistage hydraulic machine, when it is required to rapidly control the degree of opening of the guide vanes at a time of an accident which occurs during the operation control of the machine or a time of stopping the operation, the influence of the pressure variation of the water on the flow passage of the machine, i.e. the safeness of the flow passage of the machine, will be determined by the method of controlling the guide vanes of the respective stages of the multistage hydraulic machine.

SUMMARY OF THE INVENTION

Therefore, an object of this invention is to provide a method of controlling guide vanes of a multistage hydraulic machine for the purpose of easily and safely restraining the water hammering action caused by the variation of the water flow amount at a time of controlling the guide vanes of the multistage hydraulic machine and for the purpose of extremely reducing the portions of the machine affected by the water pressure variation due to the change of the water flow amount.

According to this invention, the above object is performed in one aspect by providing a method of controlling guide vanes of a multistage hydraulic machine including a plurality of stages interconnected by return passages of the type wherein under an abnormal condition the guide vanes are closed such that the degree of opening of the guide vanes of a higher pressure stage is maintained to be always equal to or smaller than the degree of opening of the guide vanes of a lower pressure stage, and the method is characterized in that the guide vanes of the lower pressure stage are not completely closed so as to maintain a predetermined small degree of opening when the guide vanes of the higher pressure stage are completely closed.

In the other aspect of this invention, there is provided a method of controlling guide vanes of a multistage hydraulic guide machine of the type described above and the method is characterized in that only the degree of opening of the guide vanes of the higher pressure stage is reduced while the degree of opening of the guide vanes of the lower pressure stage is maintained unchanged.

BRIEF DESCRIPTION OF THE DRAWINGS

In the accompanying drawings.

DESCRIPTION OF THE PREFERRED EMBODIMENTS

Figure 1:
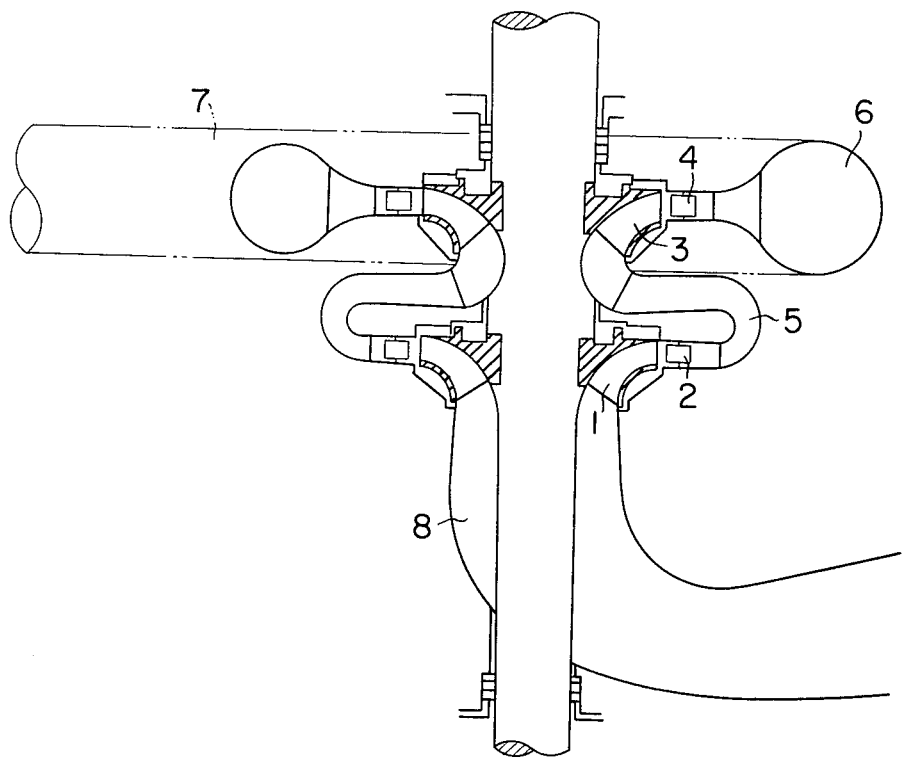
FIG. 1 is an elevational view showing a Francis-type multistage hydraulic machine to which the method of controlling the guide vanes of the machine according to this invention is applicable.
Figure 2:
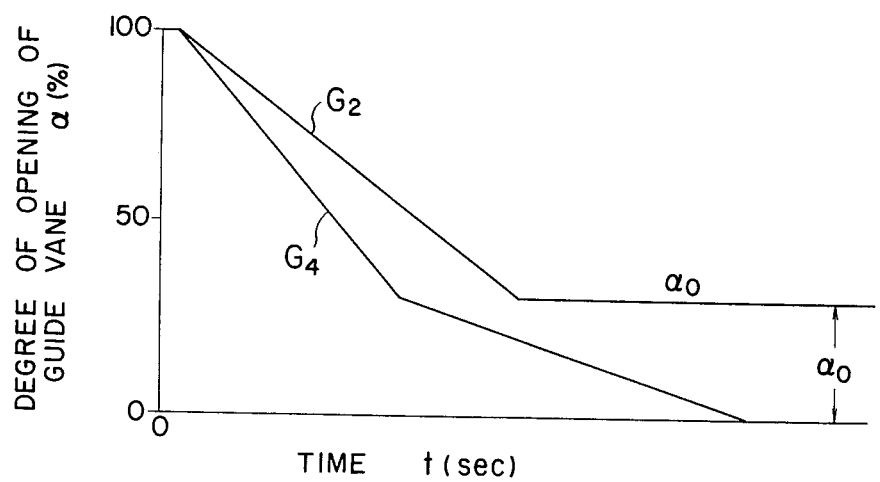
FIGS. 2 through 4 are graphes showing operational characteristics of some embodiments of the method according to this invention.

FIG. 2 shows a graph in which the ordinate designates the degree of opening $\alpha(\%)$ of guide vanes and the abscissa designates a control time (sec.). The graph shows that, when the operation of the machine is controlled by controlling the openings of the guide vanes 4 and 2 at a time of the load interruption of the water wheel or the interruption of the pump input or at a time of stopping the normal operation, the degree of opening $G_4$ of the guide vanes 4 of the high pressure stage of the multistage hydraulic machine shown, for example, in FIG. 1 is controlled to be always smaller than the degree of opening $G_2$ of the guide vanes 2 of the low pressure stage. The graph also shows that the guide vanes 4 and 2 are independently controlled, and that the guide vanes 2 are not completely closed but maintain a constant small opening $\alpha_0$.

Under these conditions, since the degree of opening $G_4$ of the guide vanes 4 has been maintained to be always smaller than the degree of opening $G_2$ of the guide vanes 2, the effect of the pressure variation of the water in the penstock 7 caused by the flow amount variation due to the control of the guide vanes 4 is large in a limited area such as a casing 6 and at portions of the flow passage on the upstream side of the guide vanes 4 of the high pressure stage, but the effect is relatively small in the area of the flow passage of the low pressure stage on the downstream side of the guide vanes 4. Thus, the structure of the almost all flow passages can safely withstand against the pressure variation of the water caused by the operation control of the guide vanes of the multistage hydraulic machine.

Furthermore, since the guide vanes 2 are not closed completely, that is, since the control of the degree of opening of these guide vanes 2 ceases such that the constant small opening $\alpha_0$ is maintained, it is not necessary to apply a large force to the guide vanes 2 to close them completely, thus reducing the size of apparatus for operating the guide vanes 2. Moreover, even if foreign substances in the water were caught by the guide vanes 2, the guide vanes would not be damaged because they are not completely closed.

As described above, the method of control of this invention having characteristics shown in FIG. 2 secures the safeness of the machine, makes compact the apparatus for operating the guide vanes and prevents the guide vanes from being damaged by foreign substances in the water.

Figure 3:
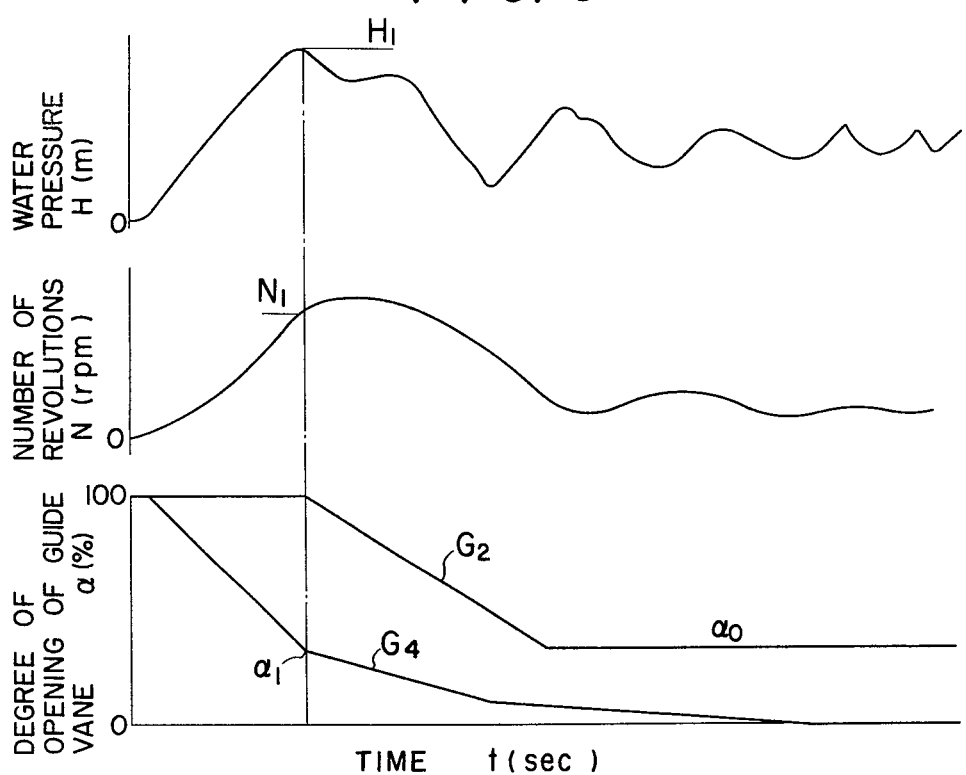

Another embodiment of this invention will be described in conjunction with FIG. 3 which includes three graphes respectively showing relationships in the operational control upon the load interruption of the water wheel between the water pressure (H, in terms of a pressure head in meter), the number of revolution ($N_{rpm}$), the degree of opening ($\alpha\%$) of the guide vanes and the time (sec.). In this operation control, the guide vanes 4 of the high pressure stage of the multistage hydraulic machine is firstly subjected to the closing control, and when the water pressure, the speed or the degree of opening of the guide vanes 4 reaches a predetermined condition (in FIG. 3; $H_1$, $N_1$, or $\alpha_1$), this condition is transmitted to apparatus for controlling the guide vanes 2 of the low pressure stage, thus performing the closing control of the guide vanes 2. However, the guide vanes 2 are not completely closed but constantly maintained at small degree of opening $G_2$ as shown in FIG. 3, and the degree of opening $G_4$ of the guide vanes 4 is always maintained to be smaller than the degree of opening $G_2$ of the guide vanes 2 during the operation control.

In the actual operation, when the water pressure H reaches the highest pressure $H_1$ upon closure of the guide vanes 4, the guide vanes 2 are closed, whereby it becomes possible to restrain the increase and the variation of the speed N of the guide vanes so as to smoothly stabilize the operation of the hydraulic machine. Moreover, since the degree of opening $G_4$ of the guide vanes 4 is always maintained to be smaller than the degree of opening $G_2$ of the guide vanes 2 during the operation control, the flow passages or the other structure of the lower pressure stage is safely protected against the pressure variation caused by the closure of the guide vanes 4 and 2. Therefore, according to the operation control method described in conjunction with FIG. 3, the closing operation of the guide vanes can be smoothly stabilized in addition to the advantages described before in connection with FIG. 2.

Furthermore, it will of course be understood that suitable operation control corresponding to a predetermined operational condition can be finely and accurately performed by transmitting the water pressure H, the number of revolution N or the degree of opening $\alpha$, or in a certain case, even the controlling time t of the guide vanes 4 of the high pressure stage, to the guide vanes 2 of the low pressure stage to control the opening of the guide vanes 2.

Figure 4:
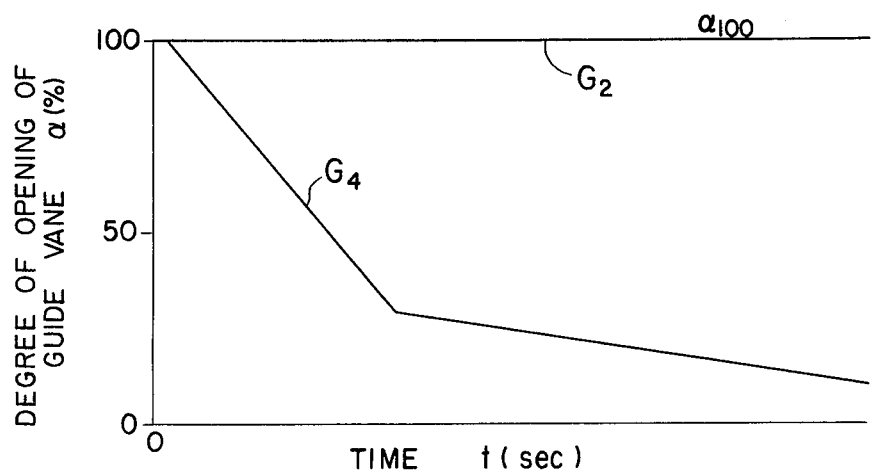

FIG. 4 also is a graph showing the characteristic of still another method of controlling the degree of opening of the guide vanes according to this invention upon occurrence of an accident or stopping of the operation of a multistage hydraulic machine. This graph shows a condition in which the guide vanes 4 of the high pressure stage is controlled to be closed, but the guide vanes 2 of the low pressure stage maintains fully opened state having a degree of opening $\alpha_{100}$. Namely, according to this controlling method, operation control instruction is transmitted only to the guide vanes 4 of the high pressure stage and not to the guide vanes 2 of the low pressure stage, thus simplifying the control. Furthermore, since the degree of opening $G_4$ of the guide vanes 4 is always maintained to be smaller than the degree of opening $G_2$ of the guide vanes 2, the multistage hydraulic machine is safely protected against the pressure variation of the water caused by the operation control of the guide vanes 4. In addition, since the guide vanes 2 are not fully closed they would not be damaged by foreign substances in the water.

As is apparent from the foregoing descriptions, according to this invention there is provided an improved method of controlling the operation of the multistage hydraulic machine capable of ensuring the security of the machine and of smoothly stabilizing the control operation.

Further, although in the foregoing disclosure, there is described the control of a Francis-type two-stage hydraulic machine, it should of course be noted that the method of this invention can also be applied to the other multistage hydraulic machine.

What is claimed is:

1. A method of controlling higher and lower pressure stage guide vanes of a multistage hydraulic machine including a plurality of stages interconnected by return passages, comprising the steps of closing the guide vanes, under an abnormal condition, such that the degree of opening of the guide vanes of the higher pressure stage is maintained always equal to or smaller than a degree of opening of the guide vanes of the lower pressure stage and maintaining the guide vanes of said lower pressure stage open a predetermined small degree when the guide vanes of said higher pressure stage are completely closed thereby to independently control variations in fluid pressure and rotating speed of said machine.

2. The method according the claim 1 wherein the guide vanes of said higher pressure stage are first closed and the guide vanes of said lower pressure stage are subsequently partially closed when the degree of opening of the guide vanes of said higher pressure stage reaches a predetermined value.

3. The method according to claim 1 wherein the guide vanes of said higher pressure stage are first closed and the guide vanes of said lower pressure stage are subsequently partially closed when water pressure acting on said hydraulic machine reaches a predetermined value.

4. The method according to claim 1 wherein the guide vanes of said higher pressure stage are first closed and the guide vanes of said lower pressure stage are subsequently partially closed when the speed of said hydraulic machine reaches a predetermined value.

5. A method of controlling higher and lower pressure stage guide vanes of a multistage hydraulic machine including a plurality of stages interconnected by return passages, comprising the steps of closing the guide vanes, under an abnormal condition, such that the degree of opening of the guide vanes of the higher pressure stage is maintained always equal to or smaller than degree of opening of the guide vanes of the lower pressure stage, and reducing only the degree of opening of the guide vanes of said higher pressure stage while the degree of opening of the guide vanes of said lower pressure stage is maintained unchanged.

* * * * *